(12) United States Patent
Rozen et al.

(10) Patent No.: US 7,439,718 B2
(45) Date of Patent: Oct. 21, 2008

(54) APPARATUS AND METHOD FOR HIGH SPEED VOLTAGE REGULATION

(75) Inventors: Anton Rozen, Gedera (IL); Michael Priel, Hertzelia (IL); Cor H. Voorwinden, Haute Garonne (NL)

(73) Assignee: Freescale Semiconductor, Inc., Austin, TX (US)

( * ) Notice: Subject to any disclaimer, the term of this patent is extended or adjusted under 35 U.S.C. 154(b) by 462 days.

(21) Appl. No.: 10/954,793

(22) Filed: Sep. 30, 2004

(65) Prior Publication Data

US 2006/0072253 A1   Apr. 6, 2006

(51) Int. Cl.
G05F 1/56 (2006.01)
(52) U.S. Cl. .................... 323/274; 323/280
(58) Field of Classification Search .......... 323/273–281
See application file for complete search history.

(56) References Cited

U.S. PATENT DOCUMENTS

| | | | | |
|---|---|---|---|---|
| 4,879,504 | A * | 11/1989 | McVey ................. | 323/272 |
| 5,079,497 | A * | 1/1992 | Barbu et al. ........... | 323/281 |
| 5,260,643 | A * | 11/1993 | Sandhu ................ | 323/225 |
| 5,994,885 | A * | 11/1999 | Wilcox et al. .......... | 323/285 |
| 6,084,386 | A * | 7/2000 | Takahashi et al. ....... | 323/273 |
| 6,222,353 | B1 * | 4/2001 | Pattamatta et al. ...... | 323/269 |
| 6,380,721 | B2 * | 4/2002 | Pattamatta et al. ...... | 323/269 |
| 6,680,837 | B1 * | 1/2004 | Buxton ................ | 361/93.9 |
| 6,870,351 | B2 * | 3/2005 | Sugimura ............. | 323/277 |
| 6,909,320 | B2 * | 6/2005 | Chan et al. ............ | 327/541 |
| 6,979,983 | B2 * | 12/2005 | Yen et al. ............. | 323/274 |
| 2006/0226821 | A1 * | 10/2006 | Whittaker ............. | 323/282 |

OTHER PUBLICATIONS

Burd, et al., "A Dynamic Voltage Scaled Microprocessor System," IEEE Journal of Solid-State Circuits, vol. 35, No. 11, Nov. 2000, pp. 1571-1580.

* cited by examiner

*Primary Examiner*—Jeffrey L Sterrett
*Assistant Examiner*—Harry Behm

(57) ABSTRACT

A high-speed voltage regulating apparatus and a method for high-speed voltage regulation. The apparatus includes: (A) a regulator, adapted to provide a regulated voltage; (B) switching circuitry, connected to the regulator, adapted to either (i) connect the regulator to an output node or (ii) disconnect the regulator from the output node; whereas the output node is connected to a dynamic power consuming device and to a load capacitor; (C) control logic, connected to the regulator, adapted to receive at least an indication reflecting a voltage of the output node and to control the switching circuitry such that the regulator is disconnected from the output node to facilitate a decrease in the voltage of the output node. The method includes: (A) determining whether to (i) decrease a voltage of an output node, (ii) to maintain the voltage of the output node or to (iii) increase the voltage of the output node; (B) allowing a voltage of an output node to decrease by disconnecting a regulator from the output node; whereas the output node is coupled to a dynamic power consuming device and to a load capacitor; and (C) providing a regulated voltage corresponding to a required voltage of the output node, if determining to maintain the voltage of the output node or to increase the voltage of the output node.

20 Claims, 3 Drawing Sheets

APPARATUS AND METHOD FOR HIGH SPEED VOLTAGE REGULATION

FIELD OF THE INVENTION

The present invention relates to methods and systems for high-speed voltage regulation and especially relates to a high-speed regulator that supports dynamic voltage scaling.

BACKGROUND OF THE INVENTION

Mobile devices, such as but not limited to personal data appliances, cellular phones, radios, pagers, lap top computers, and the like are required to operate for relatively long periods before being recharged. These mobile devices usually include one or more processors as well as multiple memory modules and other peripheral devices.

In order to reduce the power consumption of mobile devices various power consumption control techniques were suggested. A first technique includes reducing the clock frequency of the mobile device. A second technique is known as dynamic voltage scaling (DVS) or alternatively is known as dynamic voltage and frequency scaling (DVFS) and includes altering the voltage that is supplied to a processor as well as altering the frequency of a clock signal that is provided to the processor in response to the computational load demands (also referred to as throughput) of the processor. Higher voltage levels are associated with higher operating frequencies and higher computational load but are also associated with higher energy consumption.

U.S. patent application 20040052098 of Burstein et al., titled "digital voltage using current control"; U.S. patent application 20030139927 of Gabara, et al., titled "Block processing in a maximum a posteriori processor for reduced power consumption"; U.S. patent application 20020000797 of Burstein et al., titled "Switching regulator with capacitance near load"; U.S. patent application 20040025068 of Gary et al., titled "Methodology for coordinating and tuning application power"; U.S. patent application 20010038277 of Burstein et al., titled "Digital voltage regulator using current control", and "A Dynamic Voltage Scaled Microprocessor System", T. D. Burd, T. A. Pering, A. J. Stratakos and R. W. Brodersen, IEEE Journal Journal of solid-state circuits, Vol. 35, No. 11, November 200, all being incorporated herein by reference, provide a brief review of some dynamic voltage scaling techniques.

FIG. 1 illustrates the supply voltage that is being supplied to a processor (such as the CPU of FIG. 2) during the execution of various tasks as well during an idle period. For simplicity of explanation the supply voltage is illustrated as a sequence of ramps, and the transition periods between voltage ramps are not illustrated. The transition periods are very short, and typically do not exceed few milliseconds.

During a first time period $\Delta T1$ 11 that starts at T0 and ends at T1, the processor executes a very high throughput task and accordingly receives a very high frequency clock signal and a very high level supply voltage Vvery_high.

During a second time period $\Delta T2$ 12 that starts at T1 and ends at T2, the processor executes a high throughput task and accordingly receives a high frequency clock signal and a high level supply voltage Vhigh.

During a third first time period $\Delta T3$ 13 that starts at T2 and ends at T3, the processor executes a medium throughput task and accordingly receives a medium frequency clock signal and a medium level supply voltage Vmedium.

During a fourth time period $\Delta T4$ 14 that starts at T3 and ends at T4, the processor is idle and accordingly receives a very low frequency clock signal (or alternatively does not receive a clock signal) and a very low (even zero) level supply voltage Vvery_low.

During a fifth time period $\Delta T5$ 15 that starts at T4 and ends at T5, the processor executes a high throughput task and accordingly receives a high frequency clock signal and a high level supply voltage Vhigh.

It is noted that the voltage supplied to the processor is decreased (usually during a very short time period) at about T1, T2 and T3 and is increased at about T4.

FIG. 2 illustrates a prior art device 20 that includes multiple power consuming devices such as a central processing unit (CPU), SRAM and I/O card, collectively denoted 30, a frequency regulator 40, a voltage regulator 50, an output inductor 34 and a load capacitor 32.

The voltage regulator 50 receives a desired frequency from the frequency regulator 40, a 1 Mhz clock signal and provides a frequency error signal to a digital filter that in turn sends control signals to a FET control and drivers unit 52 that applies a pulse-width/pulse frequency modulation scheme to control a pair of power FET transistors Mn 56 and Mp 54. The gates of Mn 56 and Mp 54 are connected to the FET control and drivers unit 52, that turns them on and off in response to said modulation scheme. The source of Mp 54 is connected to a battery 60 and the drain of Mp 54 is connected to the drain of Mn 56. The drain of Mn 56 is grounded.

The drains of Mn 56 and Mp 54 are connected at an output node of the regulator. This output node is connected to a first end of an inductor 34. The other end of the inductor 34 is connected to a first end of a load capacitor 32. The second end of the load capacitor 32 is grounded. The second end of the inductor 34 is also connected to the frequency regulator 40 and to devices 30.

The load capacitor is relatively large (about 5.5 Microfarad). Typically, such as load capacitor 30 is used to smooth the voltage supplied to the processor. In various mobile devices the load capacitor is also used as a power reservoir that provides power during short supply power failure. Such a power reservoir is described at U.S. Pat. No. 6,226,556 of Itkin et al., which is incorporated herein by reference.

Referring back to the prior art device 20, the regulator 50 can increase or decrease the regulated voltage supplied to its output node, and thus may dynamically alter the voltage supplied to the CPU and other devices.

In some prior art regulators a decrement in the regulated voltage involves decreasing the charge of the load capacitor 32 by draining said charge to the ground. Thus each voltage decrement involves power loss.

The prior art device 20 also loses energy as a result of removing charge from the load capacitor to a battery bypass capacitor (not shown in FIG. 2).

There is a need to provide an efficient method and apparatus for dynamically providing regulated voltage to a processor.

SUMMARY OF THE PRESENT INVENTION

Dynamically altering the voltage supplied to a processor in response to the computational load of the processor and operating frequency associated with said load. The supplied voltage is decreased by allowing a load capacitor to supply the required voltage and is increased by providing an appropriate regulated voltage.

A high-speed voltage regulating apparatus that includes: (A) a regulator, adapted to provide a regulated voltage; (B) switching circuitry, connected to the regulator, adapted to either (i) couple the regulator to an output node or (ii) disconnect the regulator from the output node; whereas the output node is connected to a
   dynamic power consuming device, such as but not limited to a processor, and to a load capacitor; and
   (C) control logic, connected to the regulator,
   adapted to receive at least an indication reflecting a voltage of the output node and to control the switching circuitry such that the regulator is disconnected from the output node to facilitate a decrease in the voltage of the output node.

A method for high-speed voltage regulation that includes: (A) determining whether to (i) decrease a voltage of an output node, (ii) to maintain the voltage of the output node or to (iii) increase the voltage of the output node; (B) allowing a voltage of an output node to decrease by disconnecting a regulator from the output node; whereas the output node is coupled to a dynamic power consuming device, such as but not limited to a processor, and to a load capacitor; and (C) providing a regulated voltage corresponding to a required voltage of the output node, if determining to maintain the voltage of the output node or to increase the voltage of the output node.

A mobile device that includes: (A) a battery; (B) a dynamic power consuming device, such as but not limited to a processor, that is connected to an output node; (C) a regulator, connected to the battery, whereas the regulator is adapted to provide a regulated voltage; (D) switching circuitry, connected to the regulator, adapted to either (i) couple the regulator to the output node or (ii) disconnect the regulator from the output node; whereas the output node is further connected to a load capacitor; and a (E) control logic, connected to the regulator, adapted to receive at least an indication reflecting a voltage of the output node and to control the switching circuitry such that the regulator is disconnected from the output node to facilitate a decrease in the voltage of the output node.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following description related to supplying voltage to a processor. Those of skill in the art will appreciate that the disclosed systems and methods can be applied mutates mutandis to supplying voltage to other dynamic power consuming devices.

It is further noted that although the disclosed apparatus includes a buck switch that other switching elements and other configurations can be applied, including boost configurations and buck-boost configurations.

The term processor refers to an entity that is capable of performing various tasks that are associated with different computational loads. The processor can be a RISC processor, a general-purpose processor, a digital signal processor, a controller, a scalar processor and the like.

It is noted that typically the voltage regulator provides a supply voltage to multiple devices such as memory banks, displays and the like but for simplicity of explanation the drawings and associated description refer to a processor.

The term "dynamic power consuming device" refers to a device that can operate at different power consuming modes, especially in response to throughput demands that can vary over time. Such a device can be a processor that can operate at different voltage levels and different operational frequencies, to support tasks associated with different computational loads.

Figure 3:
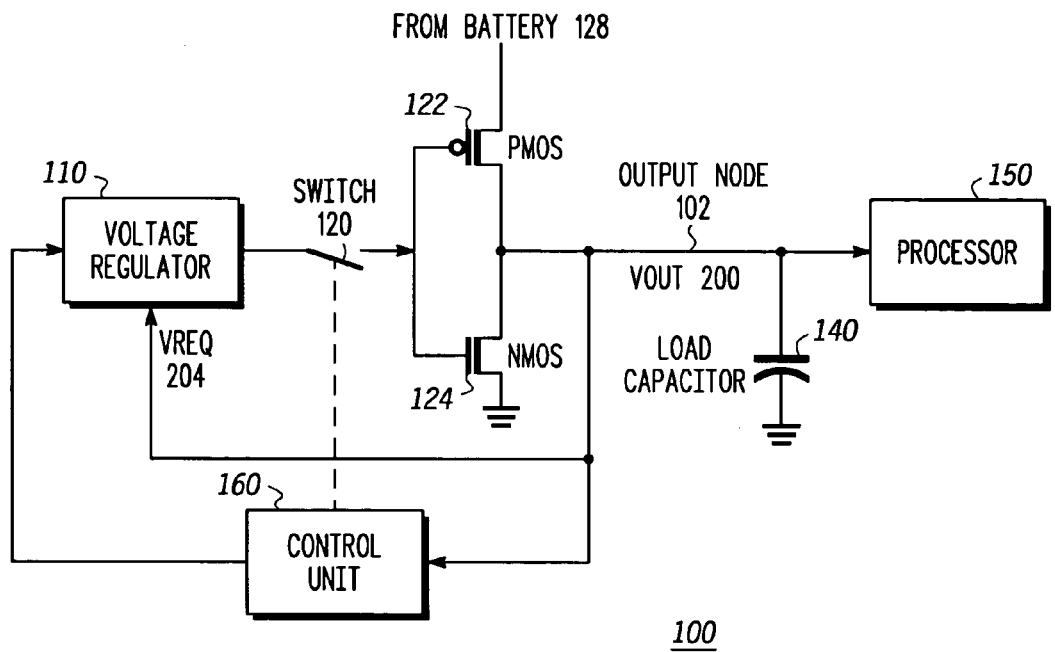
FIG. 3 is a schematic diagram of a high-speed voltage regulating apparatus, according to an embodiment of the invention.

FIG. 3 illustrates an apparatus 100 according to an embodiment of the invention. Apparatus 100 includes a voltage regulator 110, a switching circuitry such as switch 120 and a buck switch that in turn includes NMOS transistor 124 and PMOS transistor 122. Apparatus 100 further includes a load capacitor 140 and control logic 160.

Apparatus 100 includes an output node 102 that is connected to the load capacitor 140, to a processor 150 and to the output of the buck switch. The voltage of the output node is denoted Vout 130 and also referred to as "output voltage" of as the output voltage of apparatus 100.

Switch 120 is connected between the voltage regulator 110 and an input of the buck switch. The input of the buck switch is connected to the gates of transistors 124 and 122. The source of PMOS transistor 122 is connected to a battery 128 and its drain is connected to the drain of the NMOS transistor 124 to form an output node 102 of apparatus 100. The drain of the NMOS transistor 124 is grounded.

The output node 102 is connected to a device such as processor 150 and also to one end of the load capacitor 140. The other end of the load capacitor is grounded. The output node 102 is also connected to voltage regulator 110 and optionally to the control unit 160 to provide one or more feedback signals to said latter devices.

Figure 1:
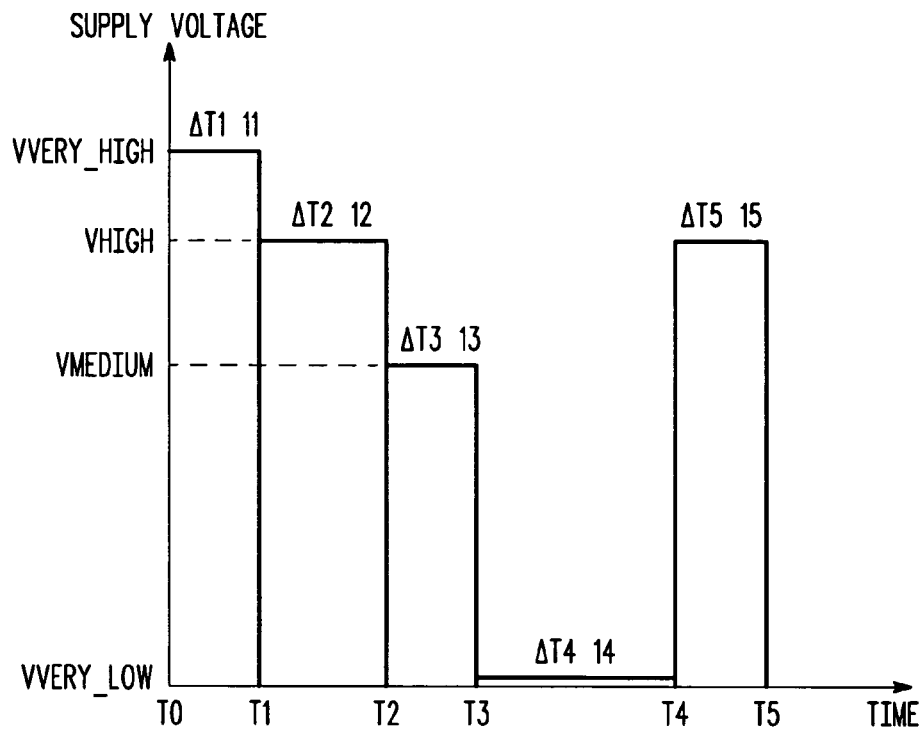
FIG. 1 is a timing diagram illustrating the change of voltage supplied to a processor in response to the changing computational loads of the processor.
Figure 2:
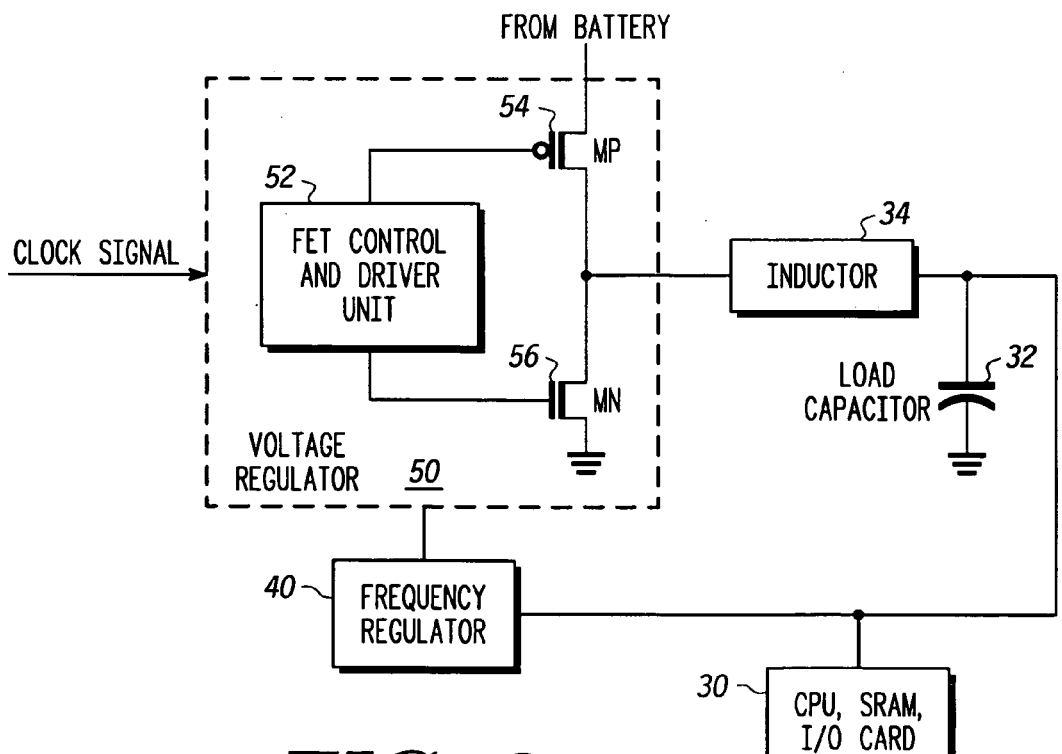
FIG. 2 illustrates a prior art device that includes a power supply unit.

The voltage regulator 110 can be any prior art device that is capable of providing a regulated voltage. It receives as inputs a signal representative of the voltage (Vout 200) of the output node 102 of apparatus 100, but may also receive Vout itself. The regulator further receives control signals such as but not limited to Vreq 204 that determines a desired Vout. The voltage regulator 110 or the control unit 160 may determine the relationship between a current value of Vout and a next value of Vout. For example, referring to the example set forth at FIG. 1, at T1 Vout has to be altered from Vvery_high to Vout.

Switch 120 is controlled by control logic 160 and can either connect the output of voltage regulator 110 to the buck switch or disconnect the buck switch from the voltage regulator 110. Switch 120 can be implemented by a transistor, although this is not necessarily so. Conveniently, when the buck switch is disconnected from the voltage regulator 110 the NMOS transistor 124 is OFF, thus preventing the load capacitor 140 to discharge through the NMOS transistor 124.

When switch 120 is closed the regulated voltage supplied by voltage regulator 110 is provided, via the buck switch, to the output node 102 of apparatus 100. When switch 120 is open the voltage regulator 110 is disconnected from the output node 102 and the voltage of the output node is decremented by the discharging of load capacitor 140 by processor 150.

The output node 102 is connected to the control unit 160 that may stop the decrement of the output voltage whenever the output voltage Vout reaches a voltage threshold. The voltage threshold can be dynamically set in response to the computational load of processor 150. Referring again to FIG. 1, at T1, when the output voltage is altered from Vvery_high to Vhigh the voltage threshold is set to Vhigh to make sure that Vout does not fall below Vhigh, so that during the second time period ΔT2 the processor can operate at an appropriate frequency.

According to an embodiment of the invention the apparatus 100 is also capable of controlling the discharge rate of the load capacitor 140 and especially to limit the discharge rate of the load capacitor 140. This includes supplying a to the output node 102 of apparatus 100 a current from PMOS transistor 122 that is ON when the switch 120 disconnects the buck switch from the voltage regulator 110. The current charges the load capacitor 140 as well as being provided to the processor 150.

A limitation of the discharge rate of the load capacitor 140 may be required in order to simplify the control scheme of the switching circuitry and especially to prevent a scenario in which the apparatus 100 is not capable of preventing a decrement of Vout below a voltage threshold due to a fast discharge of the load capacitor 140 and timing limitations associated with the control scheme.

Apparatus 100 is usually included within a mobile device, such as but not limited to a PDA or a cellular phone, and is connected to the battery of that mobile device.

Figure 4:
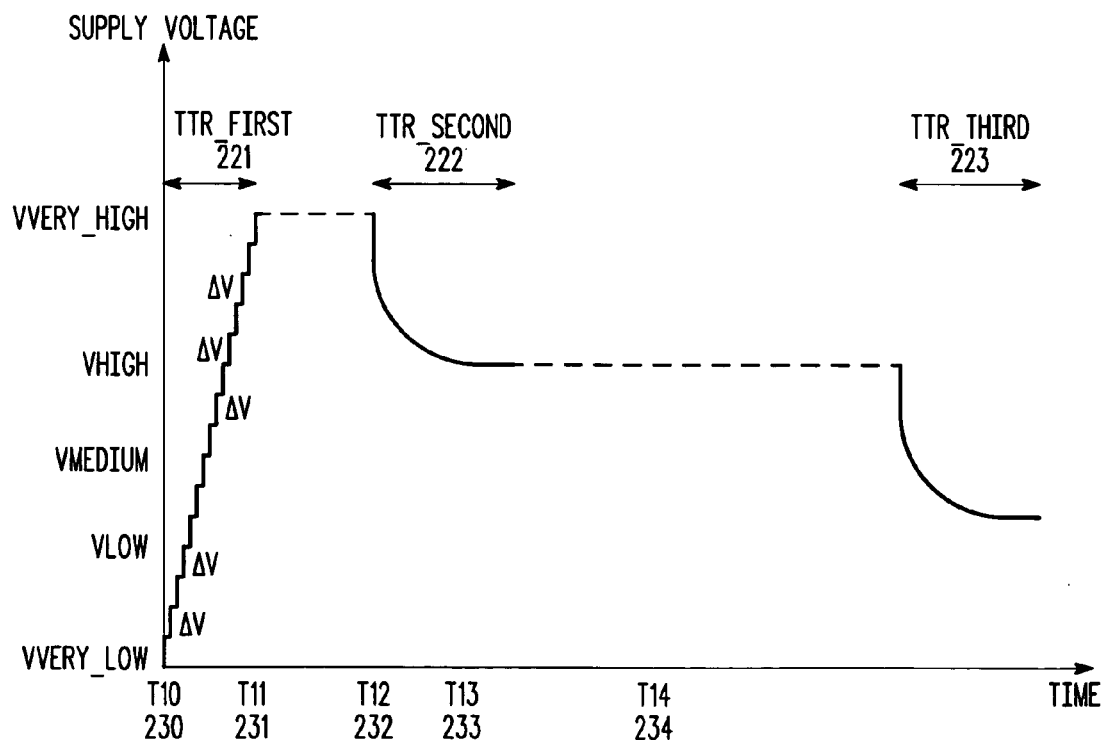
FIG. 4 is a timing diagram that illustrates an output voltage during transition periods and intermediate periods, according to an embodiment of the invention.

FIG. 4 is a timing diagram that illustrates multiple transition periods, according to an embodiment of the invention.

During a first transition period Ttr_first 221 the supply voltage is increased from Vvery_low to V_high. Ttr_first 221 starts at T10 230 and ends at T11 231. Conveniently, during this first transition period 221 the processor 150 receives regulated voltage that is gradually incremented from a current value of Vvery_low to a next value of Vvery_high, by incremental steps of ΔV. It is noted that the voltage can be incremented by other manners. Ttr_first 221 is followed by a relatively long intermediate period (illustrated by a dashed line) during which a regulated voltage of Vvery_high is provided to processor 150.

During a second transition period Ttr_second 222 the supply voltage is decreased from Vvery_high to V_high. At the beginning of that period (T12 232) the voltage regulator 110 is disconnected from the output node 102 and the processor 150 discharged the load capacitor at a current that is denoted Ihigh. Accordingly, the voltage Vout of the output node exponentially decreases. It is assumed that it decreases to Vhigh (at time T13 233) before Ttr_Second 222 ends. At that point the apparatus 100, that monitors the output voltage, connects the voltage regulator 110 to the buck switch so that a voltage of Vhigh is provided to the processor from T13 233.

The second transition period is followed by an intermediate period through which Vout is maintained at Vhigh. The second intermediate period ends at T14 234 and a third transition period Ttr_third 223 begins.

During the Ttr_third 223 Vout is exponentially decreased but does not reach Vlow, thus during the whole period the voltage regulator 110 is disconnected.

According to an embodiment of the invention if the decrement rate of Vout is too slow (for example is below a predefined discharge rate) then Vout can be further decremented even after the transmission period and any following intermediate period ends.

Figure 5:
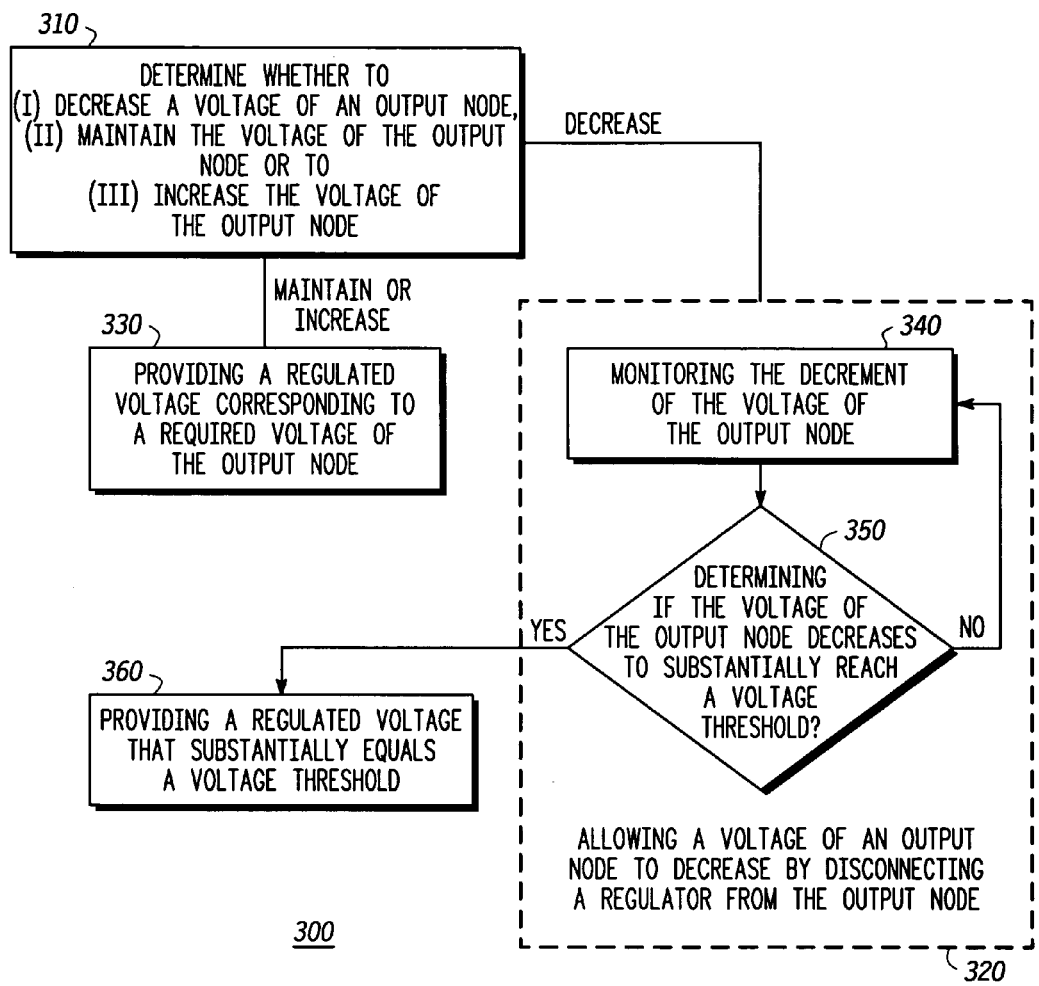
FIG. 5 is a flow chart illustrating a method for high-speed voltage regulation, according to an embodiment of the invention.

FIG. 5 is a flow chart illustrating method 300 for high-speed voltage regulation, according to an embodiment of the invention. Method 300 starts by stage 310 of determining whether to (i) decrease a voltage of an output node, (ii) to maintain the voltage of the output node or to (iii) increase the voltage of the output node. Referring to FIG. 3, the control logic 160 determines a target Vout level and sends voltage regulator 110 appropriate control signals.

Stage 310 is followed by stage 320 if stage 310 determines to decrease Vout. Stage 320 includes allowing a voltage of an output node to decrease by disconnecting a regulator from the output node; whereas the output node is coupled to a dynamic power consuming device such as but not limited to a processor and to a load capacitor. Referring again to FIG. 3 the processor 150 is connected to load capacitor 140 that is discharged while providing the processor 150 with the required voltage and current. It is noted that during this stage the voltage regulator 110 is disconnected from the output node 102 and that it may be re-connected when Vout reaches a voltage threshold.

Stage 310 is followed by stage 330 if stage 310 determines to maintain or to increment Vout. Stage 330 includes providing a regulated voltage corresponding to a required voltage of the output node. Referring to FIG. 3, during this stage switch 120 is closed.

Stage 320 conveniently includes stage 340 of monitoring the decrement of the voltage of the output node and stage 350 of determining if the voltage of the output node decreases to substantially reach a voltage threshold. The voltage threshold can be dynamically set to a required voltage level in response to characteristics of dynamic power consuming device, such as computational load of a processor.

Stage 350 is followed by stage 360 of providing a regulated voltage that substantially equals a voltage threshold when the voltage of the output node decreases to substantially reach the voltage threshold. Stage 350 is followed by stage 340 while the voltage of the output node is above the voltage threshold.

Conveniently, stage 320 also includes controlling a rate of decrement of the voltage of the output node by supplying a charging current to at least the load capacitor. A portion of that current can flow through the processor 150 while another portion charges the capacitor 140.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A high-speed voltage regulating apparatus, the apparatus comprising:

a regulator, adapted to provide a regulated voltage;
switching circuitry, coupled to the regulator, adapted to either (i) couple the regulator to an output node or (ii) disconnect the regulator from the output node;

whereas the output node is coupled to a dynamic power consuming device and to a load capacitor; and control logic, coupled to the regulator, adapted to receive at least an indication reflecting a voltage of the output node and to control the switching circuitry such that the regulator is disconnected from the output node to facilitate a decrease in the voltage of the output nodes;

wherein the apparatus is further adapted to stop a decrement of the voltage of the output node when the voltage of the output node reaches a voltage threshold that enables the dynamic power consuming device to operate at a power consuming mode out of different power consuming modes of the dynamic power consuming device;

wherein the apparatus is further adapted to constantly provide a charging current to the load capacitor and to the dynamic power consuming device the while the regulator is disconnected from the output node.

2. The apparatus of claim 1 adapted to prevent a decrement of the voltage of the output node below the voltage threshold by coupling the regulator to the output node.

3. The apparatus of claim 2 further adapted to prevent a decrement of the voltage of the output mode by configuring the regulator to provide the regulated voltage that substantially equals the voltage threshold.

4. The apparatus of claim 1 wherein the switching circuitry constantly provides the charging current regardless of a level of an output current drained by the processor.

5. The apparatus of claim 1 wherein the switching circuitry comprises a buck switch.

6. The apparatus of claim 1 wherein the regulated voltage is responsive to an operating frequency of the dynamic power consuming device.

7. The apparatus of claim 1 adapted to increase the regulated voltage in moderate steps when the control logic determines to increase the voltage of the output node.

8. The apparatus of claim 1 wherein the regulator is coupled to a battery.

9. A method for high-speed voltage regulation, the method comprises:
   determining whether to (i) decrease a voltage of an output node, (ii) to maintain the voltage of the output node or to (iii) increase the voltage of the output node;
whereas the output node is coupled to a dynamic power consuming device and to a load capacitor;
   allowing a voltage of an output node to decrease by disconnecting a regulator from the output node; whereas the output node is coupled to a processor and to a load capacitor; stopping a decrement of the voltage of the output node when the voltage of the output node reaches a voltage threshold that enables the dynamic power consuming device to operate at a power consuming mode out of different power consuming modes of the dynamic power consuming device; and
      providing a regulated voltage corresponding to a required voltage of the output node, if determining to maintain the voltage of the output node or to increase the voltage of the output node; and constantly providing a charging current to the load capacitor and to the dynamic power consuming device while disconnecting the regulator from the output node.

10. The method of claim 9 further comprising monitoring the decrement of the voltage of the output node and providing a regulated voltage that substantially equals a voltage threshold when the voltage of the output node decreases to substantially reach the voltage threshold.

11. The method of claim 9 further comprising constantly providing the charging current regardless of a level of an output current drained by the processor.

12. The method of claim 9 wherein the required voltage of the output node is responsive to an operating frequency of the dynamic power consuming device.

13. A mobile device comprising:
   a battery;
   a dynamic power consuming device, coupled to an output node;
   a regulator, adapted to provide a regulated voltage;
   switching circuitry, coupled to the regulator, adapted to either (i) couple the regulator to the output node or (ii) disconnect the regulator from the output node;
whereas the output node is further coupled to a load capacitor; and
   control logic, coupled to the regulator, adapted to receive at least an indication reflecting a voltage of the output node and to control the switching circuitry such that the regulator is disconnected from the output node to facilitate a decrease in the voltage of the output node;
   wherein the mobile device is further adapted to stop a decrement of the voltage of the output node when the voltage of the output node reaches a voltage threshold that enables the dynamic power consuming device to operate at a power consuming mode out of different power consuming modes of the dynamic power consuming device;
   wherein the mobile device is further adapted to constantly provide a charging current to the load capacitor and to the dynamic power consuming device while the regulator is disconnected from the output.

14. The mobile device of claim 13 further adapted to prevent a decrement of the voltage of the output node below the voltage threshold by coupling the regulator to the output node.

15. The mobile device of claim 14 further adapted to prevent a decrement of the voltage of the output mode by configuring the regulator to provide the regulated voltage that substantially equals the voltage threshold.

16. The mobile device of claim 13 adapted to constantly provide the charging current regardless of a level of an output current drained by the processor.

17. The mobile device of claim 13 wherein the switching circuitry comprises a buck switch.

18. The mobile device of claim 13 wherein the regulated voltage is responsive to an operating frequency of the dynamic power consuming device.

19. The mobile device of claim 13 further adapted to increase the regulated voltage in moderate steps when the control logic determines to increase the voltage of the output node.

20. The mobile device of claim 13 wherein the different power consuming modes allow the dynamic power consuming device to execute at least two out of the following tasks: a very high throughput task, a high throughput task and a medium throughput task.

* * * * *